Patented Oct. 27, 1953

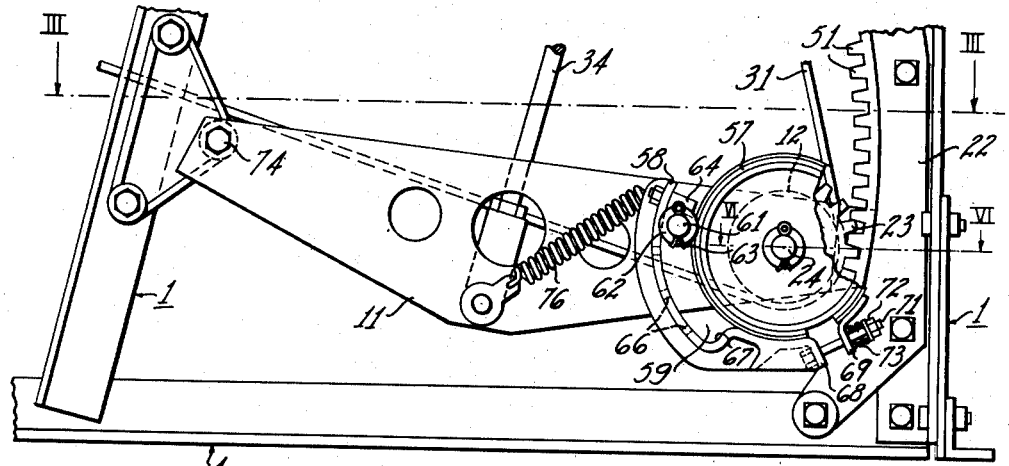
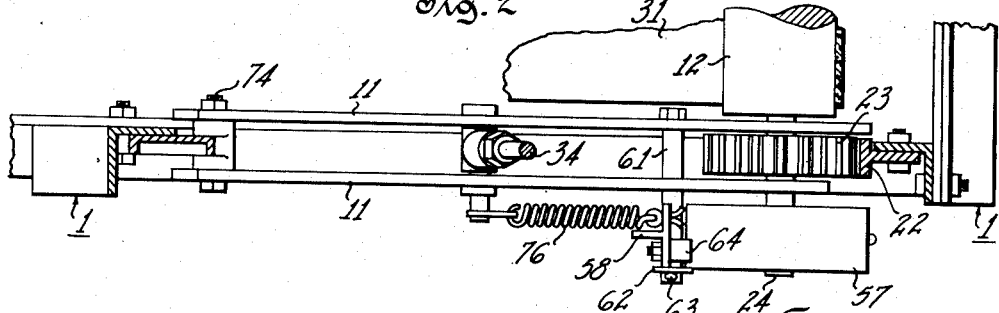
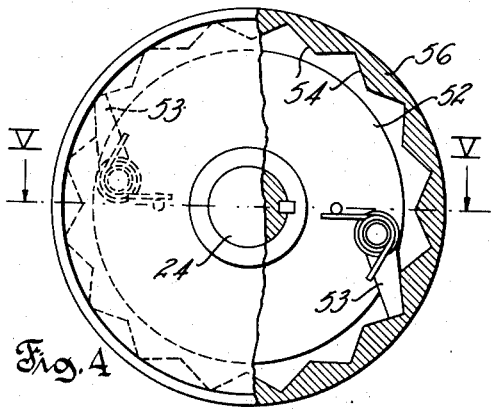
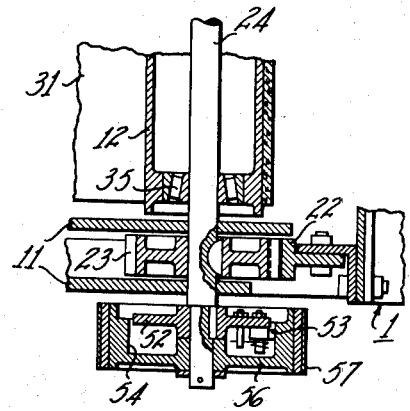
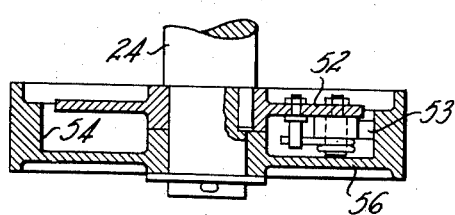

2,656,786

UNITED STATES PATENT OFFICE 2,656,786

SOFT CENTER BALE ATTACHMENT

Paul H. Harrer, La Porte, Ind., assignor to Allis-Chalmers Manufacturing Company, Milwaukee, Wis.

Application August 7, 1952, Serial No. 303,083

8 Claims. (Cl. 100—88)

This invention relates to hay balers and similar machines which operate to pick up material lying on the ground, form it into bales and wrap the bales with binding material so that they will not fall apart after they have been discharged from the machine.

Hay balers of this general character have heretofore been suggested, and are widely used, in which a mat of the picked up material is rolled by means of oppositely driven belts into a cylindrical bale, and the present invention is directed more particularly toward and contemplates a rotary hay baling machine incorporating features of improvement advantageously affecting the rolling of the mat into a formed cylindrical bale.

The principal object of this invention is to provide an improved rotary hay baler of the hereinabove outlined character, whereby soft center bales can be produced.

Another object of this invention is to provide an improved bale density controlling mechanism for a rotary hay baler of the hereinabove outlined character, whereby soft center bales can be produced and which mechanism is simple in design, can be economically manufactured and is efficient in operation.

Another object of this invention is to provide a bale density controlling mechanism of the hereinabove outlined character whereby the first rolled or center portion of a cylindrical bale will be rolled up under a light or negligible compacting pressure and the remaining portion of the bale will be rolled up under an appreciable compacting pressure which is applied after the first or soft center portion of the bale has been rolled up.

A further object of this invention is to provide a bale density controlling mechanism of the hereinabove outlined character whereby the first rolled portion of a cylindrical bale will be rolled up under minimum compacting pressure, and which mechanism incorporates readily adjustable means for varying the amount of material which is rolled up under such minimum compacting pressure.

Another object of this invention is to provide means for adjusting the compacting pressure under which the final portion of a bale is rolled and wherein such adjustment of the final compacting pressure is substantially without effect upon the size and density of the soft center part of the bale.

Another object of this invention is to provide a bale density controlling mechanism for rotary hay balers whereby soft center bales can be produced and which mechanism can be easily adjusted to produce conventional bales, that is, bales having substantially uniform density from center to periphery.

The significance of the hereinabove stated objects and the manner in which they may be readily accomplished in whole or in part will become apparent as the disclosure progresses and particularly points out additional objects, advantages and features which are considered of special importance and of general application, although they are herein shown and described as applied to the type of machine disclosed in C. J. Scranton et al., U. S. 2,468,641 and P. H. Harrer, U. S. 2,424,821, issued April 26, 1949, and July 29, 1947, respectively.

Accordingly, the invention may be considered as consisting of the various features of construction, correlation of elements and arrangements of parts as more fully set forth in the appended claims and disclosed in the following detailed description, reference being had to the accompanying drawings, in which:

Fig. 2 is an enlarged fragmentary side view of a portion of the machine shown in Fig. 1, with the machine in initial bale forming condition;

Fig. 3 is a sectional view taken along the line III—III of Fig. 2;

Fig. 4 is an enlarged side view, partly in section, of a ratchet device forming part of the bale density controlling mechanism shown in Figs. 2 and 3;

Fig. 5 is a sectional view taken on line V—V of Fig. 4; and

Fig. 6 is a sectional view taken on line VI—VI of Fig. 2.

Figure 1:
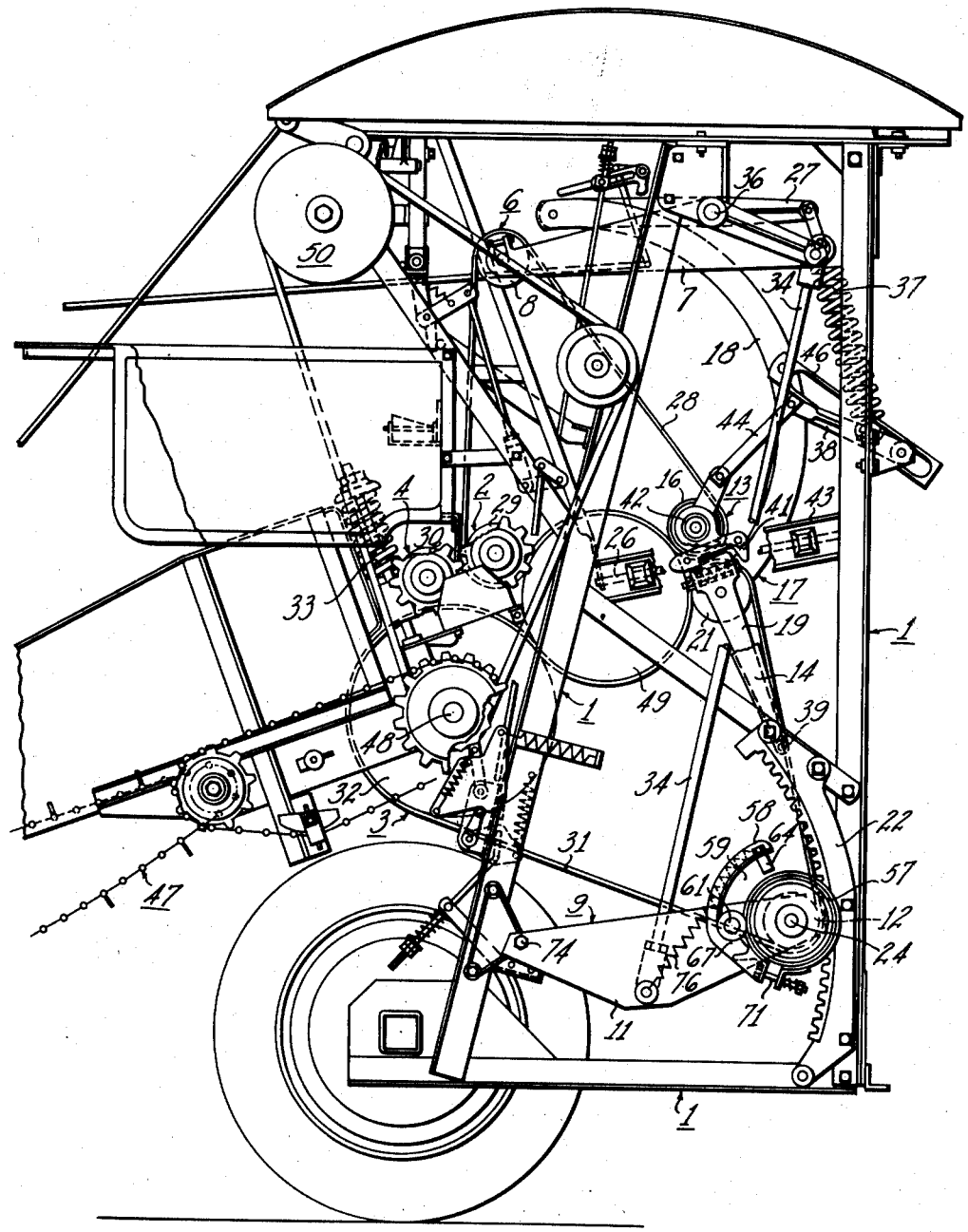
Fig. 1 is a side view of a rotary baling machine embodying the invention, with parts broken away to better show details of construction, and wherein the machine has partially rolled a bale.

The herein disclosed embodiment of the present invention is an improvement of a bale density controlling mechanism disclosed and claimed in a copending application Serial No. 290,394, filed on May 28, 1952, by E. W. Olson and R. E. Lee for Bale Density Controller.

Referring to Fig. 1 of the accompanying drawings, it is seen that the invention may be applied to a wheel supported baling machine including a frame structure 1 operatively mounting an upper drive roll assembly 2; a lower drive roll assembly 3; a press roll assembly 4; an upper tension roll assembly 6 including pivotally supported tension arms 7 (only one of which is shown) rotatably mounting a roll 8; a lower tension roll assembly 9 including pivotally supported tension arms 11 (only one of which is shown) rotatably mounting a roll 12; an upper trip roll assembly 13 including an arm 14 rotatably supporting a roll 16; a lower trip roll assembly 17 including a hanger or bow member 18 supported at its lower end on arm 19 which in turn rotatably mounts a roll 21; arcuate racks 22 with which are engaged pinions 23 (Fig. 2) carried by the adjacent end of lower tension or torque transmitting shaft 24; a pivoted latch release bar 26; and a discharge rocker arm 27.

One or more endless bale forming bands or belts 28 are mounted for movement over the roll portion 29 of drive roll assembly 2, over the roll 8 of the upper tension roll assembly 6, and over the roll 16 of the upper trip roll assembly 13. Also one or more endless bale forming bands or belts 31 are mounted for movement over the roll portion 32 of drive roll assembly 3, over the roll 12 of the lower tension roll assembly 9, and over the roll 21 of the lower trip roll assembly 17; the belts being driven in opposite directions by the roll portions 29 and 32 of the drive roll assemblies 2 and 3, respectively. Press roll assembly 4 is preferably gear driven by the upper drive roll assembly 2 as shown in Fig. 1 and the roll portion 30 of assembly 4 is preferably urged toward roll portion 32 of lower drive roll assembly 3 by means of one or more springs 33.

The upper and lower tension arms 7 and 11 are swingably interconnected for simultaneous angular movement by means of a rod 34, and the upper tension arms 7 and discharge rocker arm 27 are mounted for relative pivotal movement about a common fulcrum 36, arm 7 being biased by a spring (not shown) for clockwise movement about said fulcrum, and counterclockwise movement of arm 27 being resiliently restrained by means of a spring 37 having one end connected with one arm of a bell crank lever 38 and having its other end connected with the adjacent end of arm 27. Trip roll arms 14 and 19 are pivotally interconnected at 39 for relative angular movement and are normally retained locked in the aligned position shown in Fig. 1 by means of a releasable latch 41 carried by arm 14 in a position to engage the top portion of arm 19. Arm 14 also has mounted thereon a flanged wheel 42 adapted to engage and roll along the top surface of an inclined frame member 43 which mounts the latch bar 26; this arm and wheel being normally supported for coaction with the top surface of member 43 by means of a link 44 connecting the upper end of arm 14 with an arm of bell crank lever 38. Movement of bow member 18 toward the lower drive roll assembly 3 is limited by a loop link 46 connected as shown. Material to be baled is delivered to a point adjacent roll portions 30 and 32 of press roll assembly 4 and lower drive roll assembly 3, respectively, by means of an endless conveyer 47 which is chain driven by shaft 48 forming a part of the lower drive roll assembly.

The various parts thus far described are constructed and correlated to operate in substantially the same manner as the corresponding parts of the previously identified Scranton and Harrer patents; it being sufficient in this connection to point out that a mat of material passing the roll portions of press roll assembly 4 and lower drive roll assembly 3 is engaged by the endless bale forming bands 28 and 31 and rolled into a compact cylindrical bale 49. When the bale attains a desired final diameter the conveyer 47 is stopped, and the bale is wrapped with twine which is fed to the rotating bale from an automatically controlled mechanism generally indicated in Fig. 1 by the reference character 50. Upon completion of the bale wrapping operation the latch release bar 26 is automatically actuated to lift latch 41 on arm 14 whereupon the upper and lower trip roll assemblies 13 and 17, respectively, move apart ejecting the bale rearward from between the bale forming bands 28 and 31 and out of the machine; the trip and tension assemblies automatically returning to their initial bale starting positions with the arms 14 and 19 relatched in the aligned relation shown.

As distinguished from prior art rotary balers which are constructed to produce bales which are of uniform density from center to periphery, the herein disclosed baling machine incorporates a bale density controlling mechanism which enables the machine to produce soft centered bales, and which is constructed as follows.

Referring to Figs. 1, 2 and 3, a tensioning roller 12 for the lower belts 31 is rotatably mounted on the shaft 24 by means of a pair of antifriction bearings 35, only one of which is shown in Fig. 6, and the shaft 24, in turn, is journaled at its opposite ends in arms 11 (only one of which is shown). A pair of pinions 23 (only one of which is shown) is keyed to the shaft 24 adjacent the opposite ends, respectively, of the latter, and the pinions 23 are meshed, respectively, with teeth 51 in frame supported racks 22.

A pawl housing plate 52, best shown in Figs. 4 and 5, is nonrotatably secured to shaft 24 adjacent one of the pinions 23, and a pair of spring loaded pawls 53 (see Fig. 4) is pivotally mounted on the plate 52 in radially spaced relation to shaft 24 for cooperative engagement with inner ratchet teeth 54 of a brake drum or torque transmitting element 56 which is mounted for rotation about the pawl housing plate 52. The pawl housing plate 52, pawls 53 and ratchet teeth 54 form a one-way clutch between shaft 24 and brake drum 56, which enables the shaft 24 to drive brake drum 56 in a clockwise direction as viewed in Figs. 1, 2 and 4, and to rotate in the reverse direction relative to brake drum 56 without driving same. A brake band or torque transmitting element 57 surrounds the brake drum 56 as best shown in Fig. 2. The brake band 57 and an arcuate arm 58 radially offset from the band 57 are connected together so as to form an arcuate passage 59 between the brake band 57 and the arm 58. A pin 61 extends freely through the passage 59 and is secured to arm 11 so as to serve as a stop for limiting rotary displacement of the brake band 57 and arm 58 relative to the arm 11, as will be explained more fully hereinbelow. A washer member 62 snugly fitted about pin 61 abuts the sides of arcuate arm 58, and brake band 57, thereby preventing axial outward displacement of brake band 57 and arm 58 relative to brake drum 56. A cotter key 63 passing through the distal end of pin 61 retains washer 62 positioned thereon. Brake band or friction element 57 is mounted about brake drum 56 which is mounted on shaft 24 in rotatable relation to the latter as shown in Fig. 6. Arcuate arm 58 is provided with an end stop member 64 bolted thereto and which can be bolted to arcuate arm 58 at other desired positions thereon such as is indicated by openings 66 (see Fig. 2). Stop member 64 forms one end of passage 59, and the other end of passage 59 is formed by a radial wall portion 67 of arcuate arm 58 which joins brake band 57. Clamping lugs 68 and 69 for brake band 57 are provided with apertures (not shown) for receiving a tie bolt 71 having an adjusting nut 72 on one end thereof. A coil spring 73 is mounted about bolt 71 between lug 69 and nut 72. By adjusting nut 72 the amount of retarding force exerted on brake drum 56 by brake band 57 can be varied.

Fig. 2 shows the condition of the mechanism at the start of bale formation and in that condition the nut 72 occupies a predetermined adjusted position which is dependent upon the desired density of the outer part of the bale. The selected position in which stop member 64 has been bolted into an opening 66 in arcuate arm 58 determines how much of the inner portion of the bale is rolled soft or at low density. Application of driving power to the upper drive roll assembly 2 causes the belts 31 to drive the lower tension roll 12 at a relatively high speed on shaft 24. As a mat of material is fed between the upper and lower belts 28 and 31 the bale starts to form, and when it reaches a certain diameter the lower belts 31 become subject to considerable tension and tend to pull upwardly on lower tension roll 12 and on shaft 24. This in turn causes pinions 23 to rotate while they move upward on racks 22, and the arms 11 pivot or swing upward about their pivot connection 74 with frame 1. During the upward movement of arms 11 and rotation of pinions 23, the shaft 24, pawl housing plate 52 and brake drum 56 rotate as a unit on the axis of shaft 24 relative to the arms 11. The brake band 57 and arcuate arm 58 will partake in the rotation of brake drum 56 during the initial upward movement of the arms 11 from their lowest position in which they are shown in Fig. 2, but such rotation of the band 57 and arm 58 will be stopped when the radial wall portion 67 of arm 58 contacts pin 61 on arm 11. Establishment of this contact terminates the initial or soft center portion of bale formation. As brake band 57 offered no impedance to the rotation of brake drum 56 during this initial bale formation period (because brake band 57 was rotating in unison with brake drum 56) brake drum 56 furnished substantially no resistance to pinions 23 moving up racks 22. The upper tension arms 7 are spring biased in clockwise direction, as has been mentioned hereinbefore, and since they are connected to the lower tension arms 11 through rods 34, the lower tension arms 11 are subject to a permanent spring load which resiliently resists upward swinging movement of the arms 11 throughout the bale forming operation. However, during the initial part of the bale forming operation the downwardly acting spring load on the arms 11 is relatively light, and no, or substantially no, additional resistance is offered by the brake mechanism 56, 57 to tension roll 12 moving upwardly as the bale increases in size during the initial part of the bale formation. It is therefore seen that during this initial period the material is rolled up under little or negligible compacting pressure.

After initial bale formation has been completed, as is shown in Fig. 1, further rotation of brake band 57 and arm 58 relative to arms 11 is prevented by portion 67 contacting pin 61. At this time, and during the remainder of bale formation, friction element 57 impedes the rotation of brake drum 56 with the result that the lower belts 31 are strongly tightened and cause wrapping of the outer layers of the bale under the desired tension which was preset by adjusting nut 72 prior to the start of baling operations.

When the bale is discharged, arms 11 start their downward pivotal movement, pinions 23 move down racks 22, drive shaft 24 rotates in counterclockwise direction, as viewed in Figs. 1 and 2, and pawl plate 52 ratcheting with shaft 24 relative to brake drum 56 and brake band 57 until the position shown in Fig. 2 is again reached. During this downward movement of arms 11, a spring 76 attached to the lower end of rod 34 and connected to arcuate arm 58 rotates brake element 56 and brake band 57 in a counterclockwise direction, as viewed in Figs. 1 and 2, until stop member 64 contacts pin 61.

If it is desired to operate the baler in a conventional manner, that is with the brake constantly effective to impede clockwise rotation of shaft 24 relative to arms 11, such operation can readily be obtained by positioning stop member 64 in the lowest of apertures 66 so that pin 61 has practically no play between stop member 64 and wall 67 of arcuate arm 58.

From the foregoing it will be seen that applicant has provided a simple attachment for a baler and which attachment can be easily manufactured and readily installed on a baler to provide soft center bales.

The present invention is applicable to balers incorporating density control means differing from the embodiment herein disclosed for purposes of illustration. Accordingly, it should be understood that it is not intended to limit the invention to the exact details of construction and combinations herein disclosed by way of example, as various modifications within the scope of the appended claims may occur to persons skilled in the art.

It is claimed and desired to secure by Letters Patent:

1. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element in cooperative engagement with said brake element and rotatable with the latter relative to said arm, and lost motion connecting means between said complementary brake means and said arm permitting rotation of said complementary brake means relative to said arm during initial movement of the latter from said bale starting toward said bale finishing position.

2. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element in cooperative engagement with said brake element and rotatable with the latter relative to said arm, lost motion connecting means between said complementary brake means and said arm permitting rotation of said complementary brake means in one direction relative to said arm during initial movement of the latter from said bale starting toward said bale finishing position, and means for rotating said complementary brake means relative to said arm in the opposite direction upon movement of said arm from said bale finishing toward said bale starting position.

3. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element cooperable with said brake element to rotate therewith in said one direction through a preselected arc of rotation during initial bale formation, means carried by said arm and coacting with said complementary brake means for maintaining same stationary relative to said brake element whereby said friction element impedes rotation of said brake element with a uniform frictional force during the balance of bale formation, and means carried by said arm for rotating said brake element and friction element in said opposite direction through said preselected arc of rotation upon movement of said arm from said bale finishing toward said bale starting position.

4. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element cooperable with said brake element to rotate therewith in said one direction through a preselected arc of rotation during initial bale forming, said friction element remaining stationary relative to said brake element and impeding rotation thereof with a uniform frictional force during the balance of bale forming, and biasing means carried by said arm and attached to said friction element for rotating said brake element and friction element in said opposite direction through said preselected arc of rotation upon movement of said arm from said bale finishing toward said bale starting position.

5. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element mounted about said brake element, said complementary brake means including an offset arcuate arm having a radial end portion coacting with a stop member carried by said tensioning arm whereby during initial bale forming said complementary brake means rotate with said brake element in said one direction until said radial end portion of said arcuate arm contacts said stop member, said friction element during the remainder of bale forming remaining stationary relative to said stop member thereby frictionally impeding rotation of said brake element in said one direction with a uniform frictional force, and biasing means carried by said arm and attached to said arcuate arm for rotating said brake element and friction element in said opposite directions to initial bale forming position.

6. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, and complementary brake means including a friction element mounted about said brake element for rotation therewith, said complementary brake means including an offset arcuate arm, and a stop member carried by said arm and coacting with an end portion of said arcuate arm after initial bale formation to prevent further rotation of said complementary brake means in unison with said brake element in said one direction.

7. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one-way driving connection between said torque transmitting element and said brake element for transmitting rotation of said torque transmitting element in said one direction to said brake element and permitting rotation of said torque transmitting element in said opposite direction relative to said brake element, complementary brake means including a friction element mounted about said brake element for rotation therewith, a stop member carried by said arm and coacting with said complementary brake means after initial bale formation to prevent further rotation of said complementary brake means in unison with said brake element in said one direction, and means carried by said arm for returning said friction element to initial bale forming position upon swinging movement of said tensioning arm from said bale finishing toward said bale starting position.

8. In a baling machine of the type comprising a frame, a bale rolling belt, and a tensioning arm for said belt mounted on said frame for swinging movement between bale starting and bale finishing positions, the combination of a shaft rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake drum mounted on said shaft for rotation relative thereto and for swinging movement therewith relative to said frame, a one-way driving connection between said shaft and said brake drum for transmitting rotation of said shaft in said one direction to said brake drum and permitting rotation of said shaft in said opposite direction relative to said brake drum, complementary brake means including a brake band mounted about said brake drum in frictional engagement therewith, and in rotatable relation to said tensioning arm, and a stop member carried by said arm and coacting with said complementary brake means after initial bale formation to prevent further rotation of said complementary brake means in unison with said brake element in said one direction.

PAUL H. HARRER.

No references cited.